United States Patent [19]

Bauer

[11] Patent Number: 4,878,282
[45] Date of Patent: Nov. 7, 1989

[54] METHOD FOR THE PRODUCTION OF FRICTION PLATES, SYNCHRONIZING BLOCKER RINGS OR SIMILAR STRUCTURES

[75] Inventor: Walter Bauer, Eppelheim, Fed. Rep. of Germany

[73] Assignee: Borg-Warner Automotive GmbH, Fed. Rep. of Germany

[21] Appl. No.: 238,228

[22] Filed: Aug. 30, 1988

[30] Foreign Application Priority Data

Sep. 4, 1987 [EP] European Pat. Off. ........ 87112963.1
Sep. 4, 1987 [EP] European Pat. Off. ........ 87112964.9

[51] Int. Cl.[4] .............................................. B21D 53/10
[52] U.S. Cl. ............................ 29/149.5 C; 29/149.55; 29/418
[58] Field of Search ............... 29/149.5 R, 149.5 C, 29/149.55, 233, 418; 192/118 B, 107 R

[56] References Cited

U.S. PATENT DOCUMENTS

| 3,048,250 | 8/1962 | Kershner | 192/113 B X |
| 4,011,930 | 3/1977 | Coons et al. | 192/113 B |
| 4,260,047 | 4/1981 | Nels | 29/416 X |
| 4,396,100 | 8/1983 | Eltze | 192/113 B X |
| 4,770,283 | 9/1988 | Pütz et al. | 29/527.2 |

FOREIGN PATENT DOCUMENTS

| 128758 | 12/1984 | European Pat. Off. |
| 2340464 | 8/1973 | Fed. Rep. of Germany |
| 2006352 | 5/1979 | United Kingdom |

Primary Examiner—Timothy V. Eley
Attorney, Agent, or Firm—Robert L. Zieg; James J. Jennings; James A. Geppert

[57] ABSTRACT

By complete removal of the friction lining material, grooves or slots are formed in a friction lining made of organic material, the grooves being openings or gaps that are initially closed at the ends. The friction lining is applied as a continuous member onto a support and the ends of the grooves are opened by removal of the friction lining material closing them.

14 Claims, 3 Drawing Sheets

METHOD FOR THE PRODUCTION OF FRICTION PLATES, SYNCHRONIZING BLOCKER RINGS OR SIMILAR STRUCTURES

FIELD OF THE INVENTION

The present invention relates to a novel method for the production of friction plates, synchronizing blocker rings or similar structures having a support with a friction lining applied onto it. This lining is made from organic material, preferably having a paper base, with grooves for the guidance of oil, for use in clutches, brakes, automatic transmissions and other structures; whereby the grooves form gaps in the friction lining material extending completely through the material to the support underneath.

BACKGROUND OF THE INVENTION

Friction plates made from a supporting plate having a friction lining with grooves formed therein for oil guidance for use in clutches, brakes and similar structure have been known for a long time. Usually, the supporting plate is formed of steel and the friction lining formed from a paper-like film of various compositions, mainly consisting of cellulose and synthetic fibers which contain a filler. Before application onto the supporting plate, the friction material is impregnated with a resin-like polymer which is hardened at high temperatures. synchronizer blocker rings with a similar structure, made from a ring core and a friction lining having a paper base applied onto it with grooves for the guidance of oil, are also known.

Conventionally, two methods are used for producing the grooves for the guidance of oil. Either the friction lining is pressed onto the support, that is, onto the supporting plate or ring core, and the grooves are then machined into the friction lining, or, during the pressing process, the grooves are pressed into the friction lining with the aid of an appropriately shaped molding die. In the former process, sharp wiping edges are obtained on the edges of the grooves for wiping the oil. However, these sharp edges are liable to sustain damage during the machining process and also during later operation due to interruption of the homogeneous fiber flow to weaken the structure. The second method has the advantage that the groove rims are considerably more resistant against breaking or flaking, but they do not have the desired wiping effect since they show a slight rounding on the rims. Both methods have the disadvantage that the heat conduction from the oil to the support is impaired by the insulating friction lining.

In order to obtain as high an initial coefficient of friction as possible for the shifting process in a clutch, which frictional coefficient is maintained unchanged until engagement of the clutch, while at the same time the clutch is designed in such a way that the disengaged state of the clutch results in slight entrainment losses; special efforts are necessary in the manufacture of the clutch and in the design of the grooves. In addition, it is very frequently necessary to flush as high a quantity of cooling oil as possible through the grooves during the engaged state of the clutch, while, in the disengaged state, enhanced whirling of the oil should provide additional cooling. It was found that a combination of the desired properties places high demands on the clutch, which cannot always be satisfied by machined or pressed grooves.

A synchronizing blocker ring with a friction lining having a paper base is known from GB Patent No. A-20 06 352, in which a single groove extending through the entire material of the friction lining is designed as a space in the friction lining which is not closed over the entire circumference. However, only a single groove can be formed by having this space between the ends of the friction lining.

In EP Patent No. A-01 28 758 and DE Patent No. B-23 40 464, a friction lining is applied on a supporting plate in a segmented manner, leaving continuous grooves between the segments. The individual production and separate application of several segments of the friction lining is very expensive, last but not least, because of the required precision.

SUMMARY OF THE INVENTION

The task of the present invention is to provide a method mentioned at the outset which involves inexpensive processes and with which an arbitrary number of continuous grooves can be formed in the friction lining.

This task is solved by a method in which, before application of the friction lining onto the support, grooves or slots, which are closed at the ends, are formed in the friction lining material by complete removal of the friction lining material at the position of the grooves, and the friction lining is applied as a continuous member onto the support; the open ends of the grooves being formed by removing the friction lining material that closes the grooves.

By completely removing the friction lining material at the position of the grooves, with a maximum groove depth, especially good sharpness can be obtained on the rims. The sharp-rimmed grooves provide faster wiping of the oil with a very high initial coefficient of friction at the same time. Moreover, the grooves have a larger groove volume and permit better removal of the heat for the same thickness of lining. The large groove depth provides a higher flow of the oil, which results in better cooling, and finally results in a longer lifetime of the lining. As another corollary to this, a thinner lining can be used for obtaining the same lifetime. The insulating action of the friction lining in the groove region is eliminated and thus the heat is removed faster. The application of the friction lining onto the support as a continuous member permits simple handling and precise positioning of the friction lining. Opening the ends of the grooves by removing these closing pieces of friction lining material is a process which is inexpensive and which can be readily combined with the application of the friction lining onto the support.

Removal of the friction lining material can be achieved by cutting or noncutting shaping. Removal by stamping is preferred wherein especially good sharpness of the rims can be achieved at low production costs. Stamping before impregnation of the friction lining is preferable in order to be able to coat the cut surface with the impregnating resin. Groove rims produced in this way are especially long-lived. The friction lining is to be impregnated with the appropriate polymer mixture, followed by hardening, after the shaping process had been performed.

However, it is also possible to carry out the shaping process after impregnation and hardening of the friction lining. With this procedure, the groove quality is still very good and the production process is easier.

The open ends of the grooves can be formed by stripping of the friction lining material that close the grooves simultaneously with the application of the friction lining onto the support. Preferably, a friction lining rim is removed which protrudes beyond the support. The arrangement of the grooves can be adapted to the particular requirement in order to obtain an especially desirable friction coefficient distribution. Thus, the grooves can be open at one or both ends, in the well known manner. Grooves with one end open are formed by removing the friction lining edge on one side, radially inside or radially outside, while in the case of grooves that are open on both ends, the edges of the friction lining are removed on both sides. When the grooves are closed on the outside, the oil flows off more slowly so that the outer region of the lining does not dry up as rapidly, and the increase of the coefficient of friction is slower. The oil is dammed up and produces an oil pressure in the axial direction, which promotes the separation process during the opening of the clutch or synchronizer and leads to reduced drag losses.

In the case of synchronizing blocker rings, it is desirable to keep the surfaces from which the oil is displaced as small as possible. This can be achieved when the grooves are directed axially to the axis of the synchronizing blocker ring and when, in addition to the axial grooves, there are annular grooves which are interrupted in the peripheral direction. As a result of the large number of oil wiping edges, there is rapid displacement of the oil between the contacting frictional surface of the synchronizing blocker ring and the opposing surface. Consequently, the coefficient of friction increases rapidly, which is important for good synchronization. This is especially important in the case of cold oil, and "floating" of the synchronizing blocker ring is avoided.

When the grooves are directed axially to the synchronizing blocker ring axis, the mode of operation becomes independent of the direction of rotation of the synchronizing blocker ring. If the direction of rotation of the synchronizing blocker ring is predetermined, it is preferable to use oblique grooves in order to obtain optimum wiping effect.

Finally, a combination of different groove directions is possible. Experiments showed that axially directed grooves with a circumferential groove produce especially good results.

Overall, as a result of the invention, an increase of the synchronizing moment and reduced shifting times can be obtained with the synchronizing blocker rings according to the invention.

Very generally, the method permits the production of arbitrary groove configurations, independently of the configuration of the support, in order to achieve the desired direction of oil flow.

It is advantageous when the bridges between the grooves in the friction lining are formed at the transition to the friction lining rim or friction lining bridges at the breaking lines. Thus, a cleaner separation of the friction lining rims is achieved when opening the grooves.

DESCRIPTION OF THE DRAWINGS

The invention is explained in more detail below with the aid of four practical examples. The following are shown.

DESCRIPTION OF THE PREFERRED EMBODIMENTS

Figure 1:
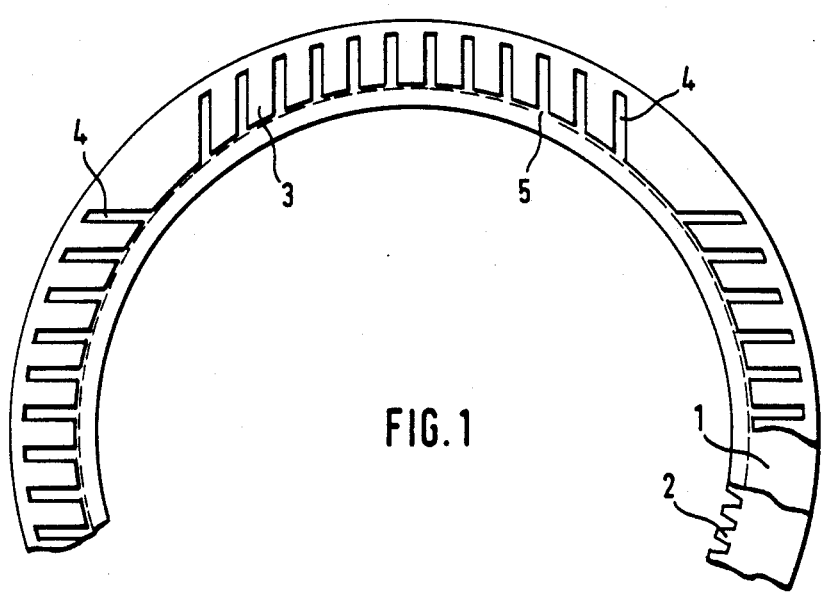
FIG. 1 is a friction plate with closed groove ends.

The friction plate according to FIG. 1 consists substantially of a supporting plate 1 with an inner spline 2 and a friction line 3. Friction lining 3 has a plurality of grooves or slots 4 which do not extend completely across the lining, at which point the friction lining part had been removed completely through the lining to the plate. Grooves 4 open toward their inner ends 5.

The swirling of the oil is especially good in a friction lining in a torque converter, when the grooves are open at their outer ends and are closed at the inner ends. Then the inner, non-grooved part of the friction lining provides a seal, which results in turbulent flow and faster removal of heat.

Figure 2:
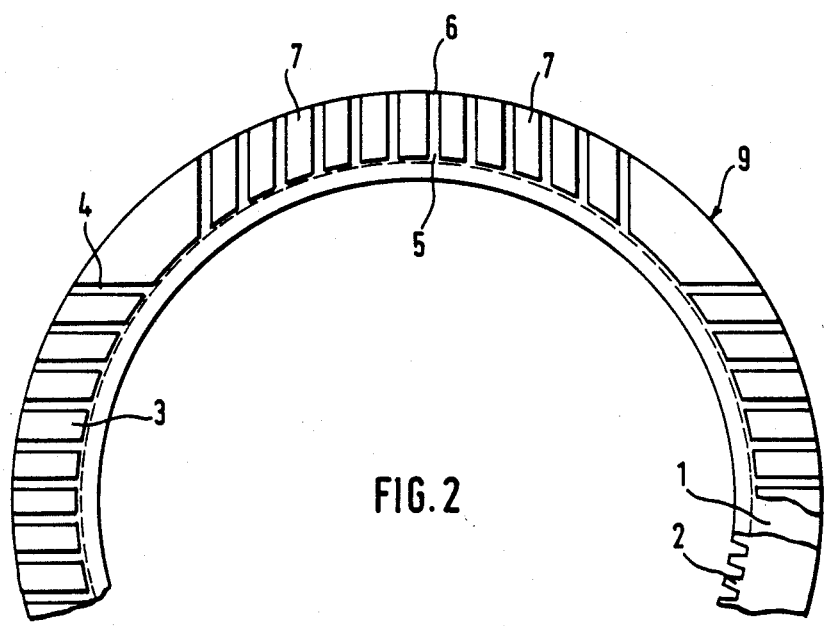
FIG. 2 is a friction plate with continuous grooves that are open on both ends.

The mode of execution according to FIG. 2 differs from the mode of execution according to FIG. 1 by the fact that the outer ends 6 of grooves 4 are also open. As is well known, a groove 4 which is open on both ends provides very rapid removal of the oil, while a groove which is open on one end, as shown in FIG. 1, permits easy opening of the plate packet as a result of the damming action of the oil. This is advantageous with regard to the drag moment of the coupling.

Figure 3:
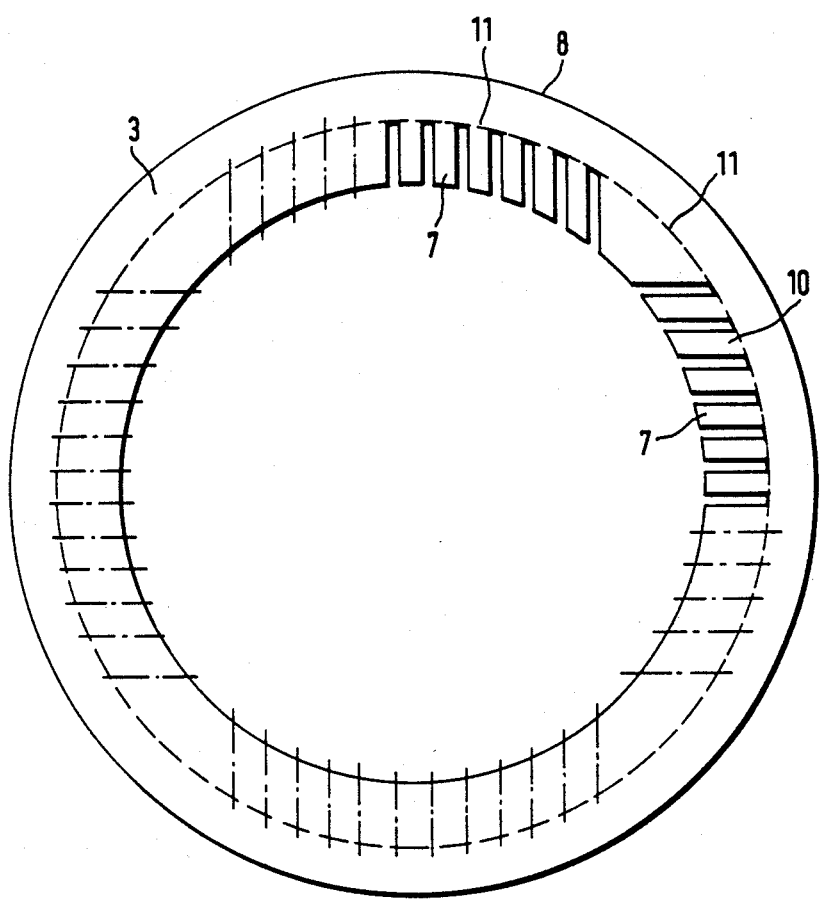
FIG. 3 shows the friction lining, after the shaping process, for a clutch plate according to FIG. 2 before application to the plate.

While in the mode of execution according to FIG. 1, the application of the friction lining 3 onto the supporting plate 1 can be done with the usual means, however, auxiliary means are necessary for applying the individual parts 7 of friction lining 3 according to FIG. 2. Such auxiliary means are shown in FIG. 3. In order to maintain the position of the individual parts 7 of friction lining 3 upon application of the friction lining onto the supporting plate 1, the grooves 4 are stamped in such a way that at least one friction lining rim 8 is retained. This friction lining rim 8 is removed only after the friction lining 3 had been applied onto supporting plate 1. This removal can be carried out especially advantageously when the friction lining rims 8 protrude beyond the edge 9 (see FIG. 2) of the supporting plate 1. Breaking lines 11 can be provided at the bridging transition 10 from parts 7 to the friction lining rim 8 which permits easy breaking of rim 8.

Figure 4:
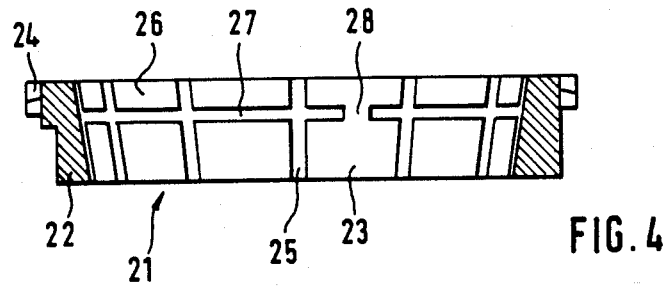
FIG. 4 is a synchronizing blocker ring in cross-section with a friction lining having axial grooves and a circumferential groove.

The synchronizing blocker ring 21 shown in FIG. 4 consists substantially of a ring core 22 made of metal and a friction lining 23. Ring core 22 has teeth 24 on its periphery. Friction lining 23 is applied onto the conically formed inside surface 26 of ring core 22. Distributed on the inner periphery of synchronizing blocker ring 21, grooves or slots 25 of the same size are provided in the lining at predetermined uniform distances, the grooves being directed in the axial direction. At the same time, there is formed a circumferential groove 27 in the lining which is interrupted at certain positions 28 to stiffen lining 23.

Figure 5:
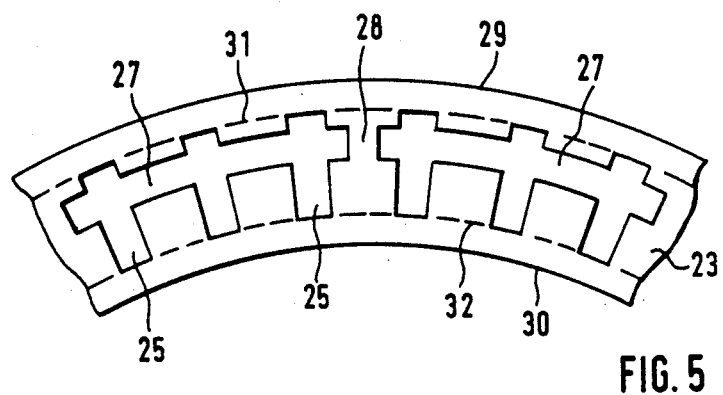
FIG. 5 shows a portion of the friction lining with axial and circumferential grooves before application onto the synchronizing blocker ring.

FIG. 5 shows a portion of the stamped friction lining 23 before application onto ring core 22. The protruding friction lining rims 29 and 30 are broken away after the friction lining 23 has been applied onto ring core 22, for example, by gluing. Breaking lines 31 and 32 are provided for this purpose. After breaking away rims 29 and 30, the axial grooves 25 are open at both ends and the oil can flow out in both directions. In order to improve the stiffness of friction lining 23 and thus make it easier to be handled during impregnation and also in order to keep the parts together in spite of the presence of the circumferential groove 27, several bridges 28 are provided which serve to connect the parts of the lining.

Figure 6:
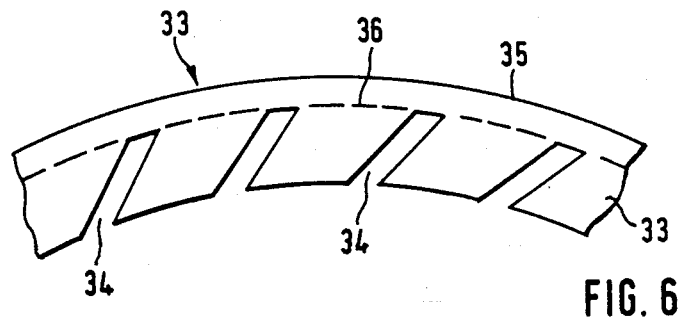
FIG. 6 shows a portion of a friction lining with oblique grooves, before application onto a synchronizing blocker ring, but after the shaping process.

FIG. 6 shows a portion of a stamped friction lining 33 with oblique grooves 34. Lining 33 has only one protruding rim 35, which is broken away after gluing the lining 33 to ring core 22. This is done along breaking line 36. After that, the completed synchronizing ring 21 is provided with grooves 34 that run obliquely and are open on both ends.

The same types of lining shapes can also be used for synchronizing blocker ring supports having an external friction lining.

I claim:

1. A method of forming friction members for use in clutches, brakes and automatic transmissions, comprising a support and a complementary friction lining, formed of an organic material having a paper base, with spaced grooves in and extending completely through the lining material to the support for the flow of oil therethrough, characterized by the steps of forming spaced grooves in the friction lining material by completely removing the lining material so the grooves extend through the material except for rims at the opposite edges thereof, said grooves each extending across the lining material between said rims, applying said friction lining material as a continuous member onto said support, and removing at least one rim to open one end of each groove.

2. The method according to claim 1, characterized by the step of cutting through the friction lining material to form the grooves.

3. The method according to claim 1, characterized by the step of a noncutting shaping operation to remove the friction lining material and form the grooves.

4. The method according to claim 1, characterized by the step of stamping the grooves into the friction lining material.

5. The method according to claim 4, characterized by the step of impregnating the friction material with resin before the stamping operation.

6. The method according to claim 4, characterized by the step of impregnating the friction lining material with resin after the stamping operation.

7. The method according to claim 1, characterized by the steps of applying the grooved friction material to the support with at least one rim extending beyond the edge of the support, and removing said extending rim to open one end of each groove.

8. The method according to claim 7, characterized by the steps of simultaneously applying the friction lining onto the support and stripping the lining material that closes the opposite ends of the grooves to provide open ends at each end of the grooves.

9. The method according to claim 1, characterized by the steps of applying the lining to the support with the outer rim extending beyond the edge thereof, and opening the ends of the grooves by removing the outer lining rim.

10. The method according to claim 1, characterized by the steps of applying the lining with the inner and outer rims extending beyond the edges of the support, and removing both of the lining rims to open the grooves at both ends.

11. The method according to claim 1, characterized by the steps of forming inner and outer peripheral rims on the lining with bridges of the friction lining remaining between the grooves at the transition to the friction lining rims and forming breaking lines on the bridges, applying the lining with the rims extending beyond the edges of the support, and separating the lining rims at the breaking lines.

12. The method according to claim 1, characterized by the steps of providing the friction lining with a conical shape to be applied onto the inner surface of a synchronizing blocker ring, said lining having both generally parallel grooves and at least one circumferential groove, forming the lining with inner and outer rims, applying the lining to the ring with the inner and outer rims extending beyond the edges of the blocker rings, and removing the rims to open the ends of the parallel grooves.

13. The method according to claim 12, characterized by the step of interrupting the circumferential groove in at least one location on the lining.

14. The method according to claim 1, characterized by the fact that the grooves are generally parallel and oblique to a radius of the friction lining member.

* * * * *